Sept. 18, 1951 J. O. DE LOSS 2,568,187
MACHINE FOR MAKING CORE BOXES
Filed Oct. 21, 1946 5 Sheets-Sheet 1
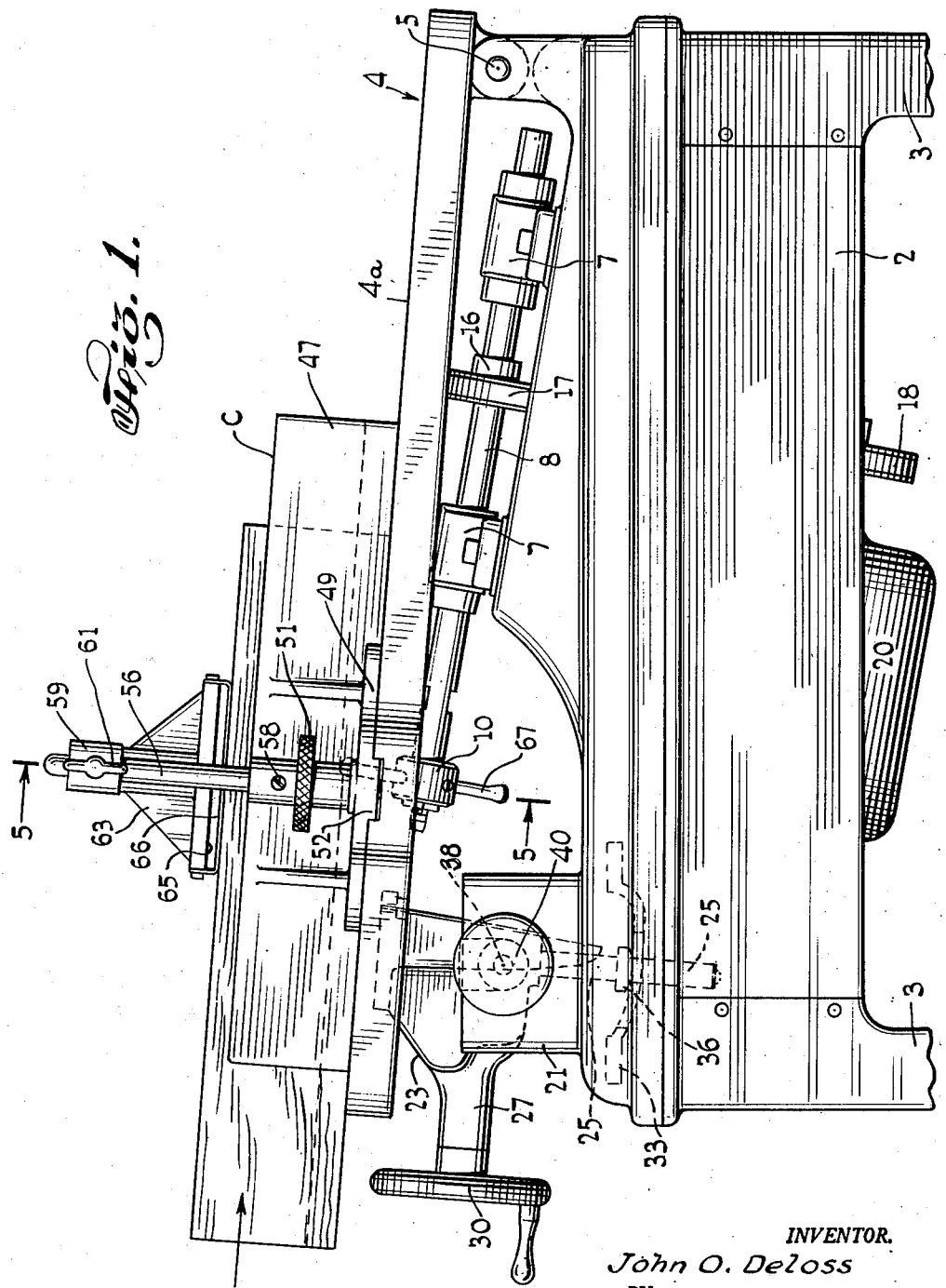
INVENTOR.
John O. DeLoss
BY
P. E. Meech
ATTORNEY

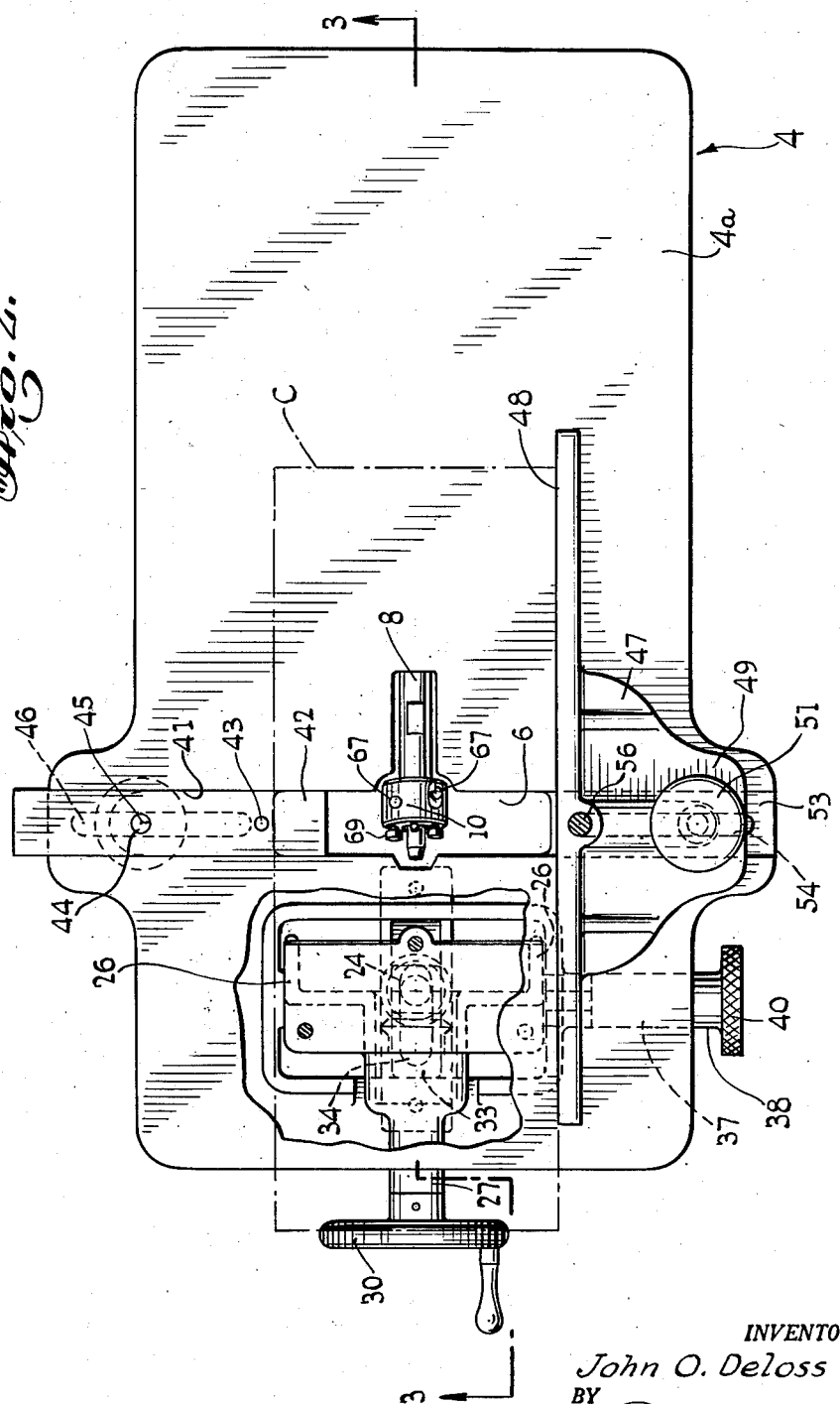

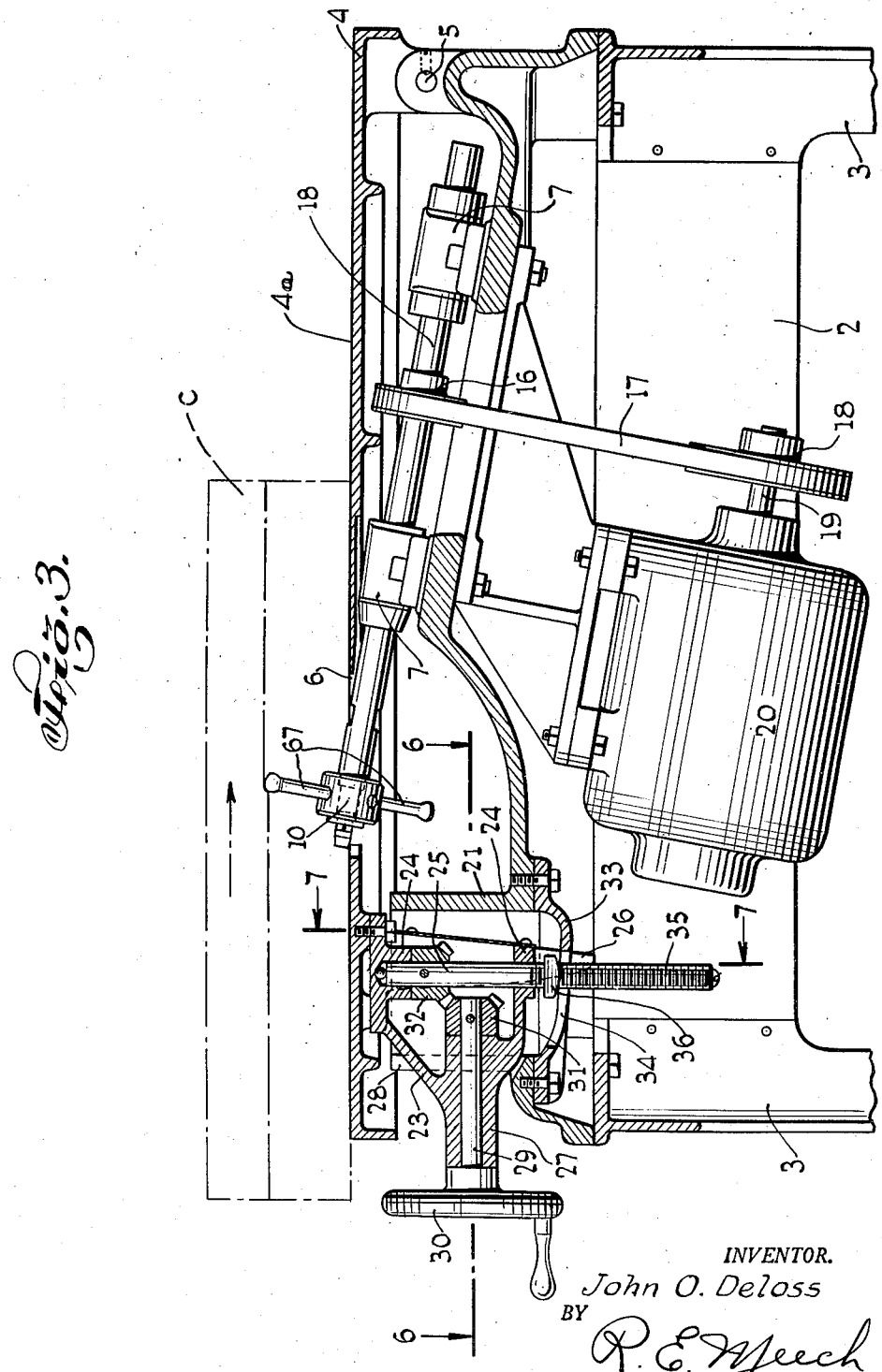

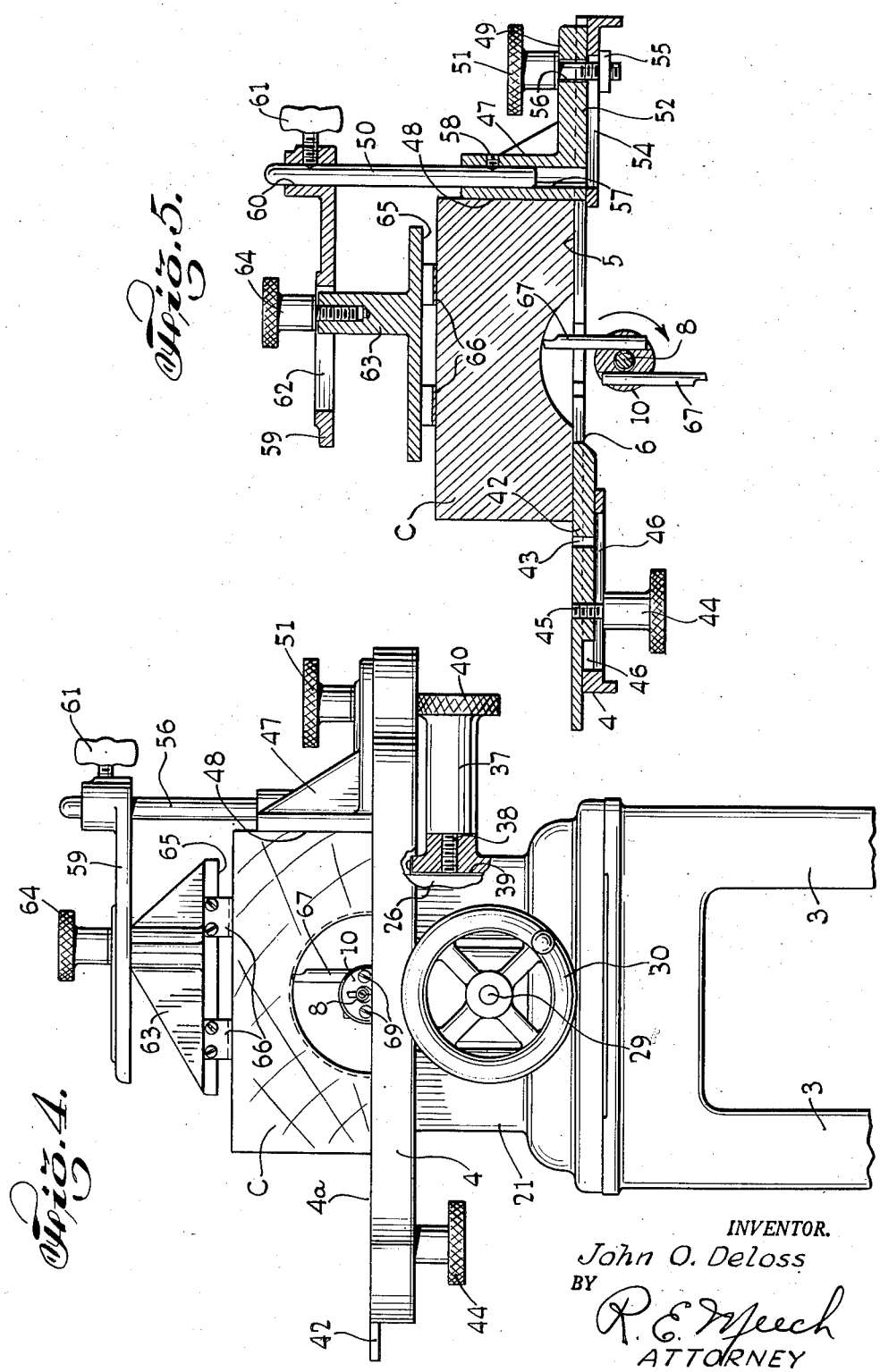

Sept. 18, 1951  J. O. DE LOSS  2,568,187
MACHINE FOR MAKING CORE BOXES
Filed Oct. 21, 1946  5 Sheets-Sheet 5
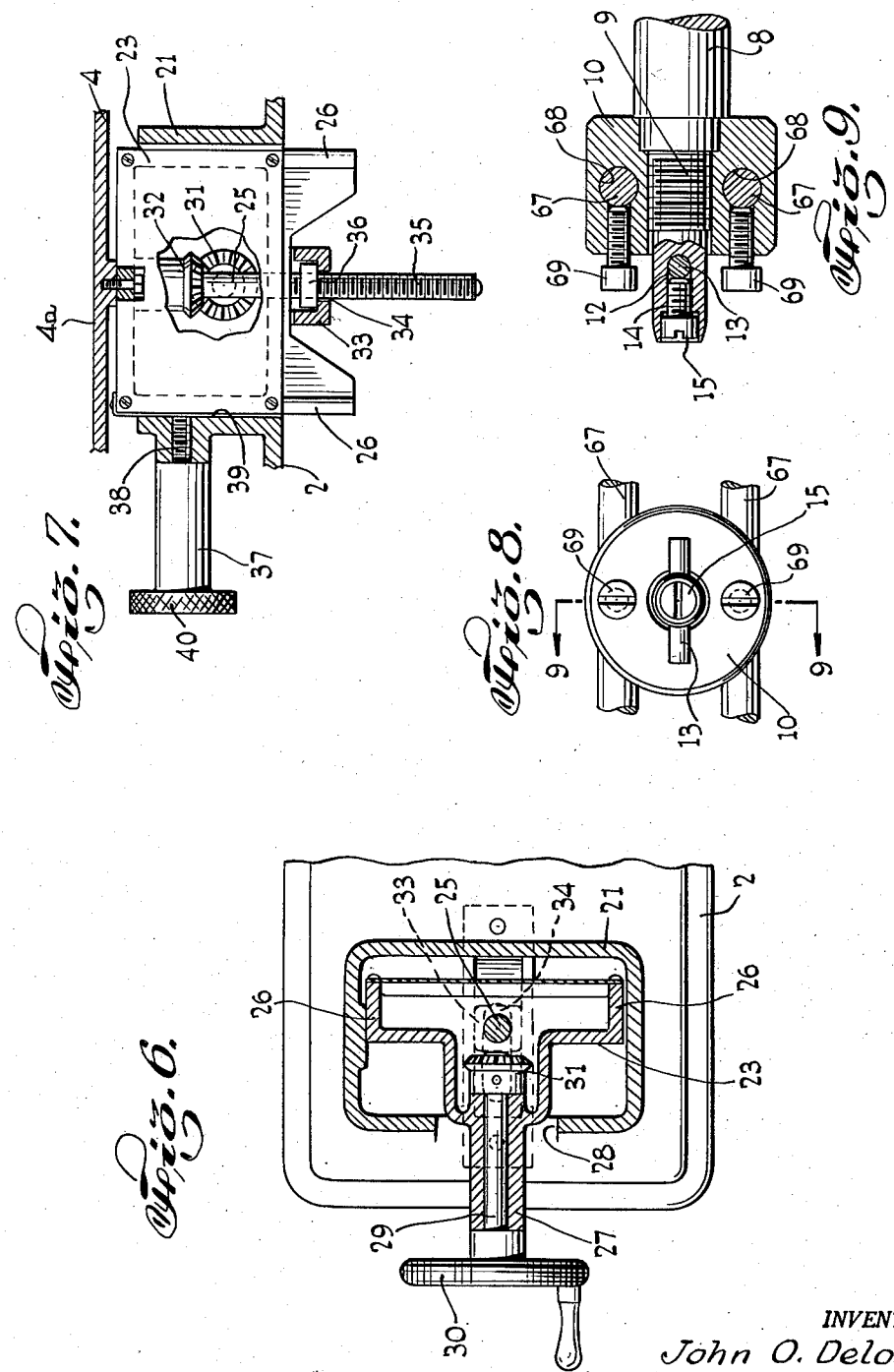
INVENTOR.
John O. Deloss
BY
R. E. Meech
ATTORNEY Patented Sept. 18, 1951

2,568,187

UNITED STATES PATENT OFFICE 2,568,187

MACHINE FOR MAKING CORE BOXES

John O. De Loss, Meadville, Pa., assignor of one-third to Michael J. De Loss and one-third to Alphonso R. De Loss, both of Meadville, Pa.

Application October 21, 1946, Serial No. 704,680

4 Claims. (Cl. 144—136)

This invention relates to the manufacture of core boxes, and particularly to an improved machine for making the same.

In the art of founding, it is customary to make sand cores for subsequent use in molding in a core box. Usually such cores are cylindrical in cross section and, consequently, the well or groove formed in the two complementary halves of the core box which form the mold for the core necessarily has to be semi-circular in cross section. Generally, the well or groove is cut in the core box manually by the use of hand tools, which procedure is both tedious and expensive. While some power device or machines have been heretofore suggested and used for cutting this well or groove, these devices were not entirely satisfactory for the reason that the radius of cut of such machines was limited and within a relatively narrow range. For instance, such devices could not be employed for cutting a relatively small radius in the core boxes, and this limited the use of such machines to the cutting of relatively large radii.

Accordingly, it is the general object of the present invention to provide a machine for cutting semi-circular wells or grooves in core boxes which can be used for cutting a well or groove having the smallest radius or one having a relatively large radius, thereby providing a machine which will cut radii within a relatively wide range.

It is another object of this invention to provide a core box cutting machine which can be used for cutting not only a straight groove, but a curved groove, such as an elbow, in the core box.

It is a further object of the invention to provide a core box cutting machine having an adjustable flat planar top equipped with suitable adjustable guides whereby the depth of the cut and the position of the cut laterally of the core box can be conveniently and accurately controlled.

It is still another object of this invention to provide an improved core box cutting machine which is simple and inexpensive in its construction, and yet efficient and effective in its use, reducing materially the time required for cutting core boxes.

Various other objects and advantages of this invention will be more apparent in the course of the following specification, and will be particularly pointed out in the appended claims.

In the accompanying drawings, there is shown for the purpose of illustration, an embodiment which my invention may assume in practice.

In these drawings:

Fig. 1 is a side elevational view of the improved machine of my invention, showing the table top in its elevated or initial cutting position;

Fig. 2 is a plan view of my machine, with the table top partly broken away;

Fig. 3 is a sectional view taken on line 3—3 of Fig. 2, showing the table top in its lowermost position;

Fig. 4 is a front elevational view of the machine of the present invention;

Fig. 5 is a sectional view taken on line 5—5 of Fig. 1;

Fig. 6 is a sectional view taken on line 6—6 of Fig. 3;

Fig. 7 is a sectional view taken on line 7—7 of Fig. 3;

Fig. 8 is an end view of the shaft and bit holder; and

Fig. 9 is a sectional view taken on line 9—9 of Fig. 8.

Referring more particularly to the drawings, the improved machine of my invention consists of a base or frame 2 having four legs 3 by which it is supported. Above the base 2, there is arranged a movable table top 4 which is attached pivotally to the base adjacent the rear end thereof, as at 4a. The table top 4 has a smooth upper planar surface 5 in which there is arranged a T-shaped opening 6 forwardly and centrally thereof.

Directly below the table top 4, there is arranged in suitable bearings 7 mounted on the top of the base 2, a rotatable shaft 8 which is arranged angularly at an acute angle relative to the planar surface 4a of the table top 4. The angle at which this shaft is arranged with the planar surface 4a is as small as permissible and should be less than ten degrees. The shaft 8 is of such length that the extreme outer end thereof extends into the T-shaped opening 6 in the table top so as to protrude a slight distance above the planar surface when the table top is disposed in its lowermost position. The outer end of the shaft 8 has a reduced end threaded portion preferably with a left-hand thread, as at 9, Fig. 9, for receiving threadedly and selectively a bit holder 10 which will be described hereinafter more in detail. In the extreme outer end of this shaft, there is arranged a diametrically extending hole or aperture 12 in which there is positioned selectively a cutting bit 13. Axially of the shaft, there is arranged in the end thereof a threaded hole 14 communicating with the hole 12 and in which there is positioned a machine screw 15 which is adapted to hold securely the bit 13 in the opening 12 in the end of the shaft, as more clearly shown in Fig. 9 of the drawings. Between the bearings 7, as shown in Figs. 1 and 3, there is mounted securely on the shaft 8, a pulley 16 over and around which there is positioned a belt 17 which extends over and around a pulley 18 mounted on the shaft 19 of an electric motor 20 carried by the base 2. This motor through the action of the belt 17 drives the shaft 8, together with the cutting bit or bits carried thereby.

As more clearly shown in Figs. 3, 6 and 7, there is carried by the base 2 adjacent the front side thereof, a rectangular-shaped housing portion 21 which is open at both top and bottom. There is attached to the bottom side of the table top 4 at a point directly above the housing portion 21, a gear box member 23 which extends into the housing and has spaced-apart bearing portions 24 arranged centrally thereof in which a vertically arranged stud shaft 25 is rotatably disposed. There is carried by the gear box 23 at either side thereof a vertically disposed, substantially V-shaped guide portion 26 for guiding the gear box 23 in its movement relative to the housing 21 in a manner to be described. There is also carried by the gear box 23, a horizontally disposed bearing portion 27 which is disposed in and extends outwardly through a vertical slotted opening 28 in the forward wall of the housing 21. There is positioned in this bearing portion, a rotatable shaft 29 on the outer end of which there is mounted a hand wheel or crank 30 for rotating the shaft 29 manually. On the inner end of the shaft 29, there is securely mounted a gear 31 which meshes with a gear 32 secured to the shaft 25.

At the open bottom side of the housing 21, there is carried by the base 2, a saddle member 33 having a horizontally extending slot 34 arranged therein through which the lower end of the shaft 25 extends. The lower portion of this shaft 25 is threaded, as at 35, and there is threaded thereon a nut-like member 36 which is seated in the saddle member 33, as clearly shown in Figs. 1, 3, and 7 of the drawings. This saddle member is constructed and arranged so that it prevents the nut 36 from turning when the shaft is rotated, but at the same time permits the nut to ride freely therein in a longitudinal direction, for a purpose to be described hereinafter.

In one side wall of the housing 21, there is arranged in an interiorly threaded portion 37 thereof, a locking screw 38 with the inner end thereof bearing against a shim-like member 39 suitably arranged on the inner wall of the housing 21, as shown in Fig. 4. This shim-like member is positioned between the adjacent guide portion 26 and the inner wall of the housing. The outer end of this screw 38 is knurled, as at 40, so that it can be easily grasped by the operator for turning the same.

As clearly shown in Figs. 2, 4, and 5 of the drawings, there is arranged in the planar surface 4a of the table top 4 at a point directly opposite one side of the opening 6 and communicating therewith, and consequently opposite the tool end of the shaft 8, a transversely extending, rectangular-shaped slot 41 in which there is disposed a movable plate-like member 42 having at least one pivot hole 43 arranged therein for receiving the dowel pin of a workpiece for a purpose hereinafter to be described. There is carried by the member 42, an adjusting screw 44 which is disposed in a threaded hole 45 therein and extends through an elongated slot 46 in the table top so as to permit lateral adjustment of the member 42 relative to the end of the shaft 8.

On the side of the table top 4 opposite that from the plate-like member 42, there is arranged an elongated side guide member 47 having a smooth inner vertical surface 48 against which the core box or workpiece is adapted to be disposed and guided as it moves through the machine. There is carried by the guide member 47, a laterally extending portion 49 having a hole 50 therein in which an adjusting and locking screw 51 is rotatably positioned. The portion 49 carries on the lower side thereof, a key portion 52 which fits into a transversely extending slot 53 arranged in the planar surface 4a at a point directly opposite the opening 6 and slot 41 therein. There is arranged centrally of the slot 53, a transversely extending slotted hole 54 through which the screw 51 extends so as to permit lateral adjustment of the guide member 47. On the lower threaded end portion of the screw 51, there is threaded a nut 55 for locking the guide member in its adjusted position upon turning of the screw.

Centrally of the guide member 47 and directly opposite the laterally extending portion 49 thereof, there is carried thereby a vertically extending rod-like member 56 with the lower end thereof securely held in a hole 57 in the guide member 47 by means of a set screw 58. On the upper end of the rod-like member 56 there is mounted for vertical adjustment, a bracket 59 which extends outwardly over the opening 6 in the planar surface 4a. This bracket 59 has a hole 60 arranged therein through which the upper end of the rod-like member 56 extends. There is provided a thumb screw 61 in a threaded hole in the bracket 59 for locking the same in its adjusted position. There is formed in the bracket 59, a laterally extending slotted hole 62 in which the upper end of a guide member 63 is held in a suspended position by means of a locking and adjusting screw 64 which permits for lateral adjustment of the member 63 relative to the bracket 59. On the lower flat surface 65 of the guide member 63, there is mounted a pair of longitudinally extending, resilient members 66, preferably made of spring steel. It is the purpose of these spring members 66 to hold the workpiece yieldably against the planar surface 5 of the table top for a purpose hereinafter to be described.

The operation of my improved machine will now be described. It will be understood that my machine may be used for cutting core box grooves or wells from the smallest diameter to a relatively large diameter. If a relatively small diameter groove is desired, the bit holder 10 is not used and, of course, is removed from the threaded end of the shaft 8 and only the cutting bit 13 is used. On the other hand, if a relatively large diameter groove is desired, the bit holder 10 is used. In such case, as more clearly shown in Figs. 8 and 9, a pair of oppositely disposed cutting bits 67 are positioned in a pair of transversely extending holes 68 in the bit holder 10. These bits are held adjustably therein by means of a pair of set screws 69. As illustrated in the drawings, the bit holder 10 is being used for cutting a relatively large groove in a core box. It will be understood that the bits 67 are positioned in the bit holder 10 so that the distance beween the outer cutting edge of the bits and the center of the shaft 8 is equal to the radius of the semi-circular groove or well desired to be cut in the core box.

The groove or well is cut in the core box C in the following manner. The core box C is positioned on the planar surface 5 against the guide member 47 and this guide member is adjusted laterally by means of the screw 51 so that the distance from the smooth guide surface 48 against which the core box is disposed to the center of the shaft 8 is equal to the distance from the guiding side of the core box to the center of the desired groove or well. This is to make certain that the cut is made at the proper point in the core box. The bracket 59 is then adjusted for height on the rod 56 by means of the screw 61 depending on the depth of the particular core box being worked upon so that the spring members 66 rest securely on top of the core box. The top guide member 63 is then adjusted laterally of the bracket 59 by means of the screw 64 so that the pair of spring members 66 substantially straddle the cutting bits 67. It is the purpose of the spring members 66 to hold the surface of the core box in which the groove or well is to be cut securely against the planar surface 4a at all times throughout the cutting operation.

The table top 4 is then moved to an elevated position about its pivotal connection at 5 by means of the hand wheel or crank 30. When the crank 30 is turned, it will be seen that the shaft 29 to which it is connected together with the gear 31 will be rotated. The stud shaft 25 in turn will be rotated due to the meshing of the gear 32 carried thereby with the gear 31. The nut 36 on the lower threaded end 35 of the shaft, however, will remain stationary due to the seating thereof in the saddle 33 thereby permitting the shaft 25 to rotate relative to the nut 36 and thus moving the shaft upwardly together with the table top 4 to which it is connected. The table top 4 is elevated to a suitable position for making the initial cut in the core box C. In such position the cutting ends of the bits 67 extend through the opening 6 and a slight distance above the planar surface 4a, as shown in Figs. 4 and 5 of the drawings. After the table top 4 has been properly positioned for the initial cut it is locked in position by means of the locking screw 38 which forces the shim-like member 39 inwardly against the guide portion 26 of the gear box 23 so as to lock the same together with the table top to which it is attached against unintentional movement during the cutting operation.

The motor 20 is then energized which in turn rotates the shaft 8 together with the cutting bits 67 carried thereby through the action of the belt 17 and the pulleys 16 and 18. The side of the core box C is held securely against the side guide 47 and moved over the planar surface 4a manually toward and into engagement with the cutting bits 67 which make an initial circular cut in the bottom surface of the core box, as shown in Fig. 5. After the initial cut is made the length of the core box or the desired length, the table top is lowered for the next and succeeding cuts by loosening the locking screw 38 and turning the hand wheel or crank 30 so as to lower the table top sufficiently for the next cut. This procedure is followed until a groove or well of the desired depth is cut in the core box, substantially as shown in Figs. 3 and 4, in which the table top is shown in its lowermost position. This completes the operations for obtaining a straight groove or well and the core box is removed from the machine.

If it is desired to cut a curved or arcuated groove or well in a core box, such as an elbow, the plate 42 is adjusted laterally by means of the screw 44 so that the distance from the center of the dowel pin receiving hole 43 in the plate 42 to the center of the shaft 8 is equal to the radius of curvature of the groove desired to be cut. It will be understood that a dowel pin is secured in the core box at the center of the desired radius of curvature therein. In making the cut, the dowel pin carried by the core box is positioned in the pivot hole 43 and the core box gradually turned on the planar surface 4a relative to the cutting bits 67 about the dowel pin. The cutting procedure is the same as that for a straight cut, as above described, with the table top 4 first elevated and then gradually lowered for each cut until the desired depth groove is obtained. The side guide 47 is not used for the cutting of such a curved groove but, if desired, the top guide 65 may be used. It will be understood that the plate member 42 may be provided with more than one dowel receiving hole 43 so as to obtain a relatively wide range of curved grooves.

As a result of my invention, it will be seen that there is provided a core box cutting machine which is extremely simple and inexpensive in its construction and use, whereby a groove or well can be cut accurately in a minimum amount of time with the least amount of effort. Such a machine is extremely flexible in its use in that it can not only be used for cutting grooves or wells within a relatively wide range of diameter, but can be used for cutting curved grooves as well.

While I have shown and described in this application an embodiment which my invention may assume in practice, it will be understood that this embodiment is merely for the purpose of illustration and that other forms may be devised within the scope of my invention as set forth in the appended claims.

What I claim as my invention is:

1. A machine of the class described comprising a planar surface for supporting and guiding the workpiece, a rotatable shaft mounted below said planar surface with the axis thereof positioned at an acute angle thereto, cutting means arranged on the upper end of said shaft, said cutting means extending through an opening in said planar surface to a point thereabove so as to engage the workpiece when the shaft is rotated, an elongated rectangular-shaped slot arranged in said planar surface directly opposite the opening therein and said cutting means and extending substantially perpendicular to said shaft, a plate-like member slidably arranged in said slot and having at least one pivot hole therein for receiving a dowel pin carried by the workpiece whereby the workpiece may be guided in an arcuate path relative to said cutting means, means for adjustably locking said plate-like member in said slot, and means for driving said shaft.

2. A machine of the class described comprising a base, a longitudinally extending table-like top member mounted on said base having a planar upper surface for supporting and guiding the workpiece, a rotatable shaft mounted on said base below said table-like top member with the axis thereof positioned at an acute angle to said planar surface, said top member having an opening arranged therein intermediate the length thereof adjacent the upper end of said shaft, cutting means arranged on the upper end of said shaft and disposed in said opening and extending above said planar surface so as to engage the workpiece when the shaft is rotated, an elongated rectangular-shaped slot arranged in said planar surface directly opposite the opening therein and said cutting means and extending substantially perpendicular to said shaft, a plate-like member slidably arranged in said slot having at least one pivot hole therein for receiving a dowel pin carried by the workpiece whereby the workpiece may be guided in an arcuate path relative to said cutting means, means for adjustably locking said plate-like member in said slot, and means for driving said shaft.

3. A machine of the class described comprising a base, a longitudinally extending table-like top member mounted on said base having a planar upper surface for supporting and guiding the workpiece, a rotatable shaft mounted on said base below said table-like top member with the axis thereof positioned at an acute angle to said planar surface, said top member having an opening arranged therein intermediate the length thereof adjacent the upper end of said shaft, cutting means arranged on the upper end of said shaft and disposed in said opening and extending above said planar surface so as to engage the workpiece when the shaft is rotated, said top member at one end thereof being pivotally connected to said base, means carried by the base adjacent the opposite end of said top member for moving said top member about its pivotal connection so as to adjust the angularity of the planar surface relative to the axis of said shaft whereby the distance that the cutting means extends above said planar surface can be varied so as to regulate the cut thereof on said workpiece, an elongated rectangular-shaped slot arranged in said planar surface directly opposite the opening therein and said cutting means and extending substantially perpendicular to said shaft, a plate-like member slidably arranged in said slot having at least one pivot hole therein for receiving a dowel pin carried by the workpiece whereby the workpiece may be guided in an arcuate path relative to said cutting means, means for adjustably locking said plate-like member in said slot, and means for driving said shaft.

4. A machine of the class described, as defined in claim 3, wherein the means carried by the base adjacent the opposite end of the top member for moving the top member about its pivotal connection so as to adjust the angularity of the planar surface relative to the axis of the shaft consists of a shaft having one end thereof rotatably attached to the bottom of the planar surface with the opposite end thereof being threaded and having a nut-like member arranged thereon which is seated in a saddle member carried by the base, and means for rotating said shaft.

JOHN O. DE LOSS.

REFERENCES CITED

The following references are of record in the file of this patent:

UNITED STATES PATENTS

| Number | Name | Date |
|---|---|---|
| 577,792 | Stephens et al. | Feb. 23, 1897 |
| 584,854 | Crane | June 22, 1897 |
| 1,483,889 | Karr | Feb. 19, 1924 |
| 2,259,092 | Trebert | Oct. 14, 1941 |